(12) United States Patent
Kim

(10) Patent No.: US 6,168,879 B1
(45) Date of Patent: Jan. 2, 2001

(54) CAP ASSEMBLY FOR SECONDARY BATTERY

(75) Inventor: Chang-Seob Kim, Kyonggi-do (KR)

(73) Assignee: Samsung Display Devices Co., Ltd. (KR)

(*) Notice: Under 35 U.S.C. 154(b), the term of this patent shall be extended for 0 days.

(21) Appl. No.: 09/215,978

(22) Filed: Dec. 18, 1998

(30) Foreign Application Priority Data

May 8, 1998 (KR) ................................. 98-16434

(51) Int. Cl.⁷ ............................. H01M 2/34; H01M 2/04
(52) U.S. Cl. ....................... 429/61; 429/57; 429/94; 429/175
(58) Field of Search ........................ 429/175, 61, 57, 429/94, 7

(56) References Cited

U.S. PATENT DOCUMENTS 4,897,323 * 1/1990 Hennrich et al. ................. 429/94

* cited by examiner

Primary Examiner—John S. Maples
(74) Attorney, Agent, or Firm—Baker & McKenzie

(57) ABSTRACT

The present invention provides a cap assembly for a secondary battery having a can and a roll electrode assembly received in the can. The cap assembly comprises a negative plate for mounting on an upper end of the can, a positive plate disposed on the negative plate, an insulating member disposed between the negative and positive plates, a current control member disposed on the positive plate, and a rivet penetrating central portions of the negative and positive plates, the rivet being insulated from the negative plate by a gasket and connected to the roll electrode assembly through a tab. The current control member reduces conductivity between the rivet and the positive plate, thereby cutting off the flow of the current.

11 Claims, 4 Drawing Sheets

CAP ASSEMBLY FOR SECONDARY BATTERY

BACKGROUND OF THE INVENTION

1. Field of the Invention

The present invention relates to a secondary battery and, more particularly, to a cap assembly of a prism-type secondary battery which can enhance safety of the battery.

2. Description of the Prior Art

A secondary battery is rechargeable and is designed to a small size but having a large capacity. Nickel metal hydride, Lithium, and Lithium-ion batteries are now widely used as secondary batteries.

In the Lithium-ion battery, a Li-transition metal oxide material is used as a positive active material, and as a negative active material, a carbon, or a carbon compound is used. Charging and discharging of the Lithium-ion battery is realized by moving the lithium ions between positive and negative electrodes on which positive and negative active materials are deposited, respectively.

FIG. 3 shows a conventional Lithium-ion battery.

As shown in the drawing, the conventional Lithium-ion battery comprises a roll electrode assembly 2 consisting of a positive electrode, a negative electrode, and a separator disposed between the positive and negative electrodes; a can 4 into which the roll electrode assembly 2 is received, the can 4 contacting the negative electrode of the roll electrode assembly 2; and a cap assembly 6 close-tightly mounted on an upper end of the can 4. Internal insulating plates 8 are provided at upper and lower ends of the roll electrode assembly 2 to prevent the electrode assembly from contacting the cap assembly 6 and the can 4.

The cap assembly 6 comprises a negative plate 10 welded on the upper end of the can 4 and a positive plate 12 disposed on a center portion of the cap assembly 6, and an insulating plate 14 disposed between the negative and positive plates 10 and 12. A rivet 16 penetrates through a center of the negative and positive plates 10 and 12 and is connected to the positive electrode of the roll electrode assembly 2 through a tab 18. The rivet 16 is insulated from the negative plate 10 by a gasket 20 disposed there between.

Electrolyte is injected into the battery through an injection hole 22 formed in the negative plate 10, after which a plug is inserted into the hole 22 and welded therein to seal the hole 22.

In addition, to prevent the battery from exploding by an excessive increase in internal pressure, a safety groove 24 is formed, through an etching process or an electro-foaming process, on the negative plate 10 of the cap assembly 6.

In the above described Lithium-ion battery, when a short occurs in the battery by an outer conductive material, an overcurrent flows. The overcurrent may cause the battery to explode by a thermal runway phenomenon.

To solve the above problem, as shown in FIG. 4, a current control member 28 is disposed on a bottom of a can 26 to prevent the battery from exploding. The current control member 28 quickly reduces a conductivity when the battery is heated, thereby preventing the explosion of the battery.

The current control member 28 can be easily mounted inside the battery when the battery is cylindrical-shaped, which can be manufactured by clamping the cap assembly on the upper end of the can. However, when the battery is a prism-type battery the cap assembly is mounted on the upper end of the can by only laser welding. Accordingly, the current control member 28 cannot be mounted inside the battery but must be outside as shown in FIG. 4.

Therefore, to mount the current control member 28, the effective length of the prism-type battery has to be reduced by a thickness of the current control member 28. Therefore, the capacity of the conventional prism-type battery is reduced. In addition, since the current control member 28 is exposed outside, the structure of the battery becomes unstable.

SUMMARY OF THE INVENTION

The present invention has been made in an effort to solve the above described problems of the prior prism-type battery.

It is an object of the present invention to provide a battery where a current control member is mounted in an inner space which is not used in the battery, thereby increasing an effective volume of the battery to increase a capacity thereof.

To achieve the above objective, the present invention provides a cap assembly for a secondary battery having a can and a roll electrode assembly received in the can. The cap assembly comprises a negative plate for mounting on an upper end of the can, a positive plate disposed on the negative plate, an insulating member disposed between the negative and positive plates, a current control member disposed on the positive plate, and a rivet penetrating central portions of the negative and positive plates, the rivet being insulated from the negative plate by a gasket and connected to the roll electrode assembly through a tab.

Preferably, the negative plate is indented toward an inside the can. The indented depth of the negative plate is the same as a thickness of the current control member. The thickness of the current control member is about 0.8~1.0 mm.

The cap assembly further comprises a positive terminal disposed on the positive plate. The positive terminal is spaced away and insulated from the current control member but encapsulates the current control member to isolate the same from the outside.

According to another aspect, the present invention provides a secondary battery comprising a can, a roll electrode assembly received in the can, the roll electrode assembly comprising negative and positive electrodes and a separator disposed between the negative and positive electrodes, and a cap assembly. The cap assembly comprises a negative plate welded on an upper end of the can, the negative plate being electrically coupled to the negative electrode contacting the can, a positive plate insulated from the negative plate. a current control member disposed on the positive plate, and a rivet penetrating central portions of the negative and positive plates, the rivet being insulated from the negative plate by a gasket and connected to the roll electrode assembly through a tab.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF PREFERRED EMBODIMENT

A preferred embodiment of the present invention will now be described in detail with reference to the accompanying drawings, in which like reference symbols indicate the same or similar components.

Figure 1:
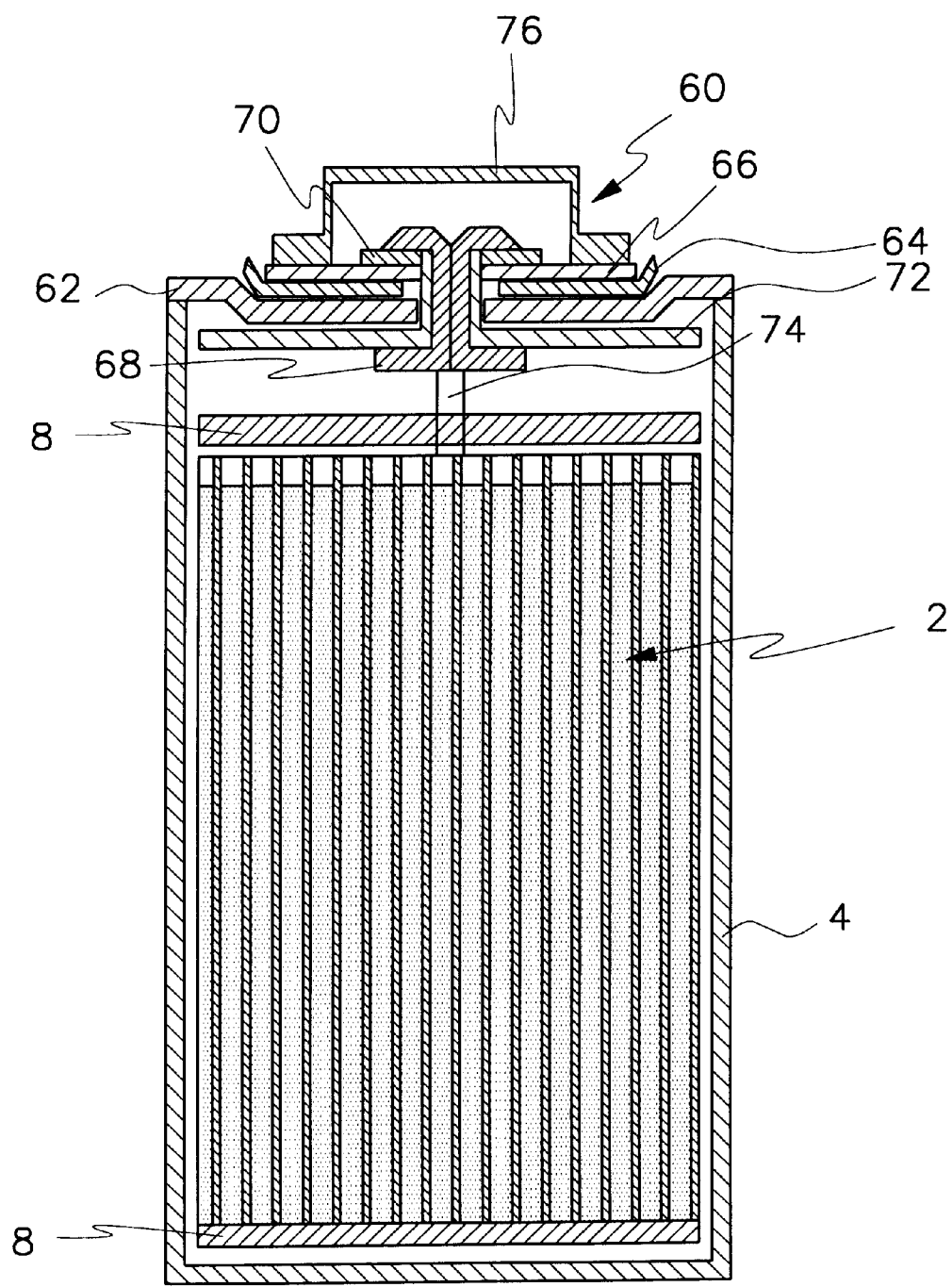
FIG. 1 is a sectional view of a secondary battery where a cap assembly according to a preferred embodiment of the present invention is employed.
Figure 2:
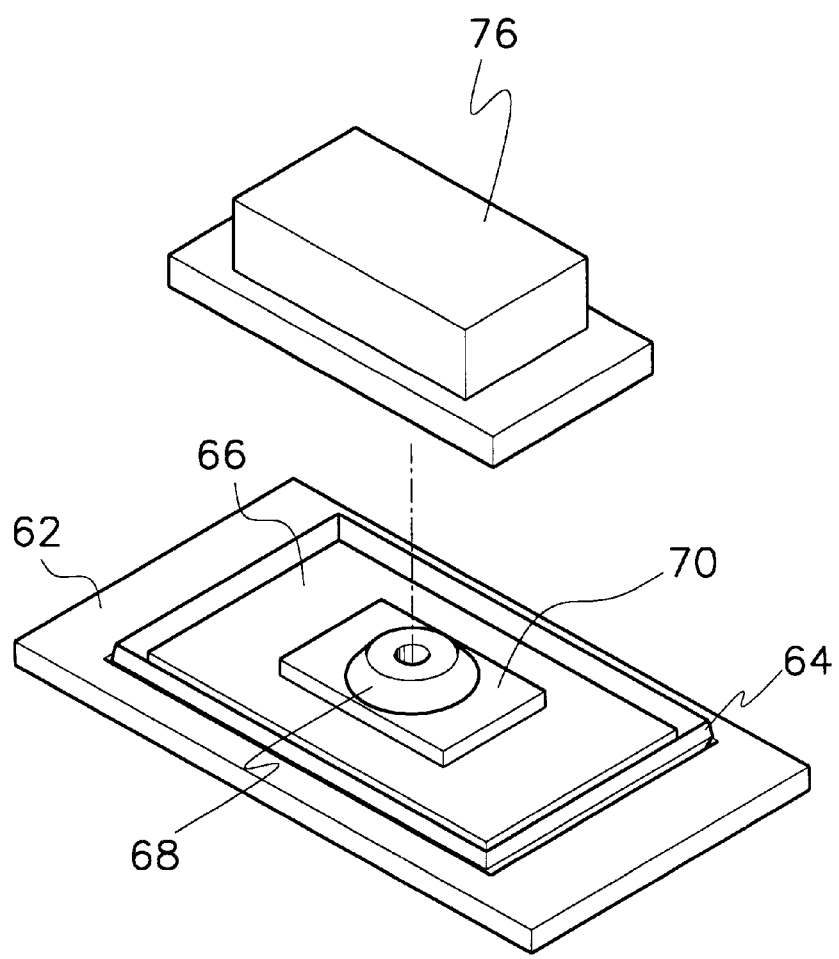
FIG. 2 is an exploded perspective view of a cap assembly according to a preferred embodiment of the present invention.
Figure 3:
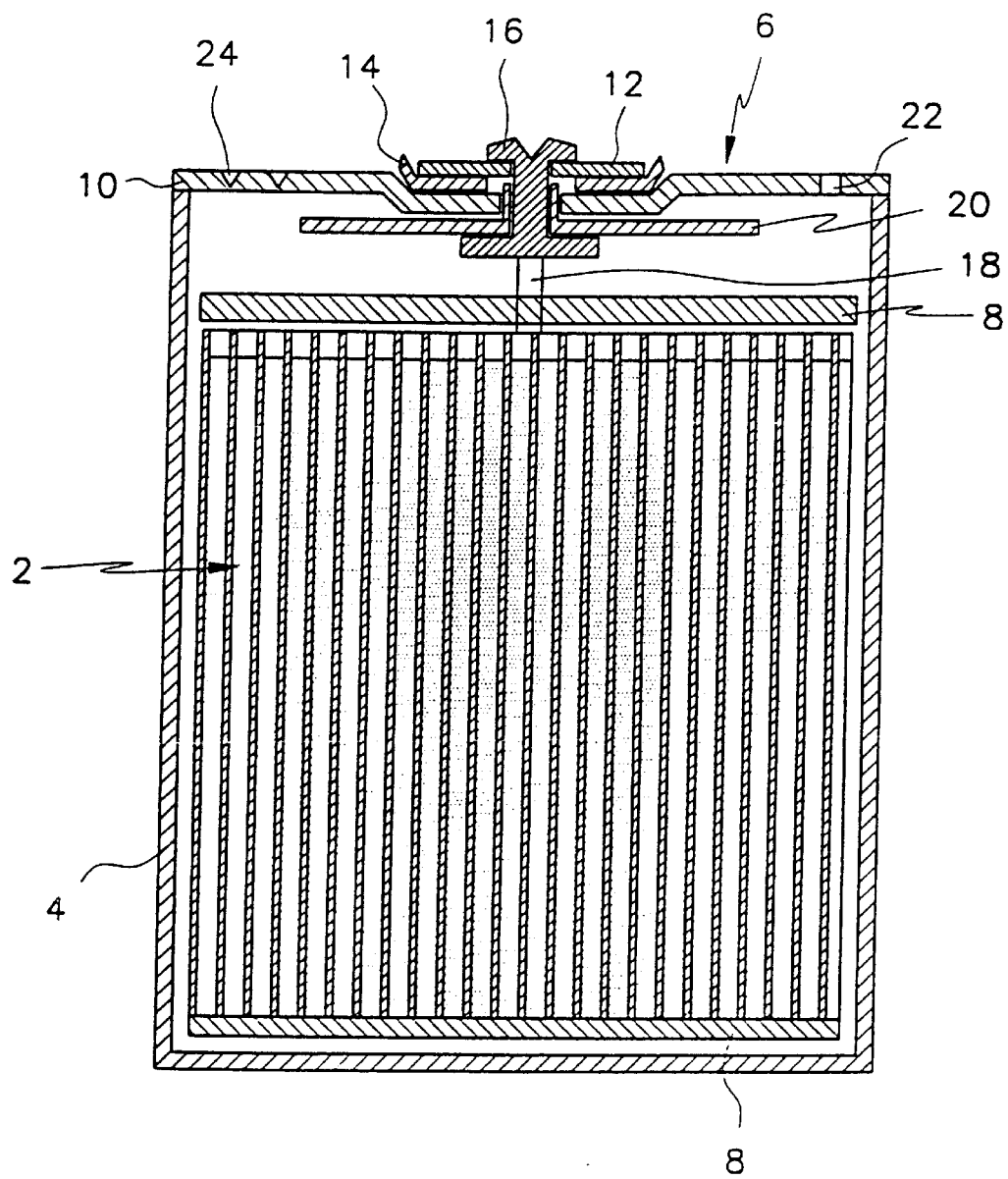
FIG. 3 is a sectional view of a secondary battery where a conventional cap assembly is applied.
Figure 4:
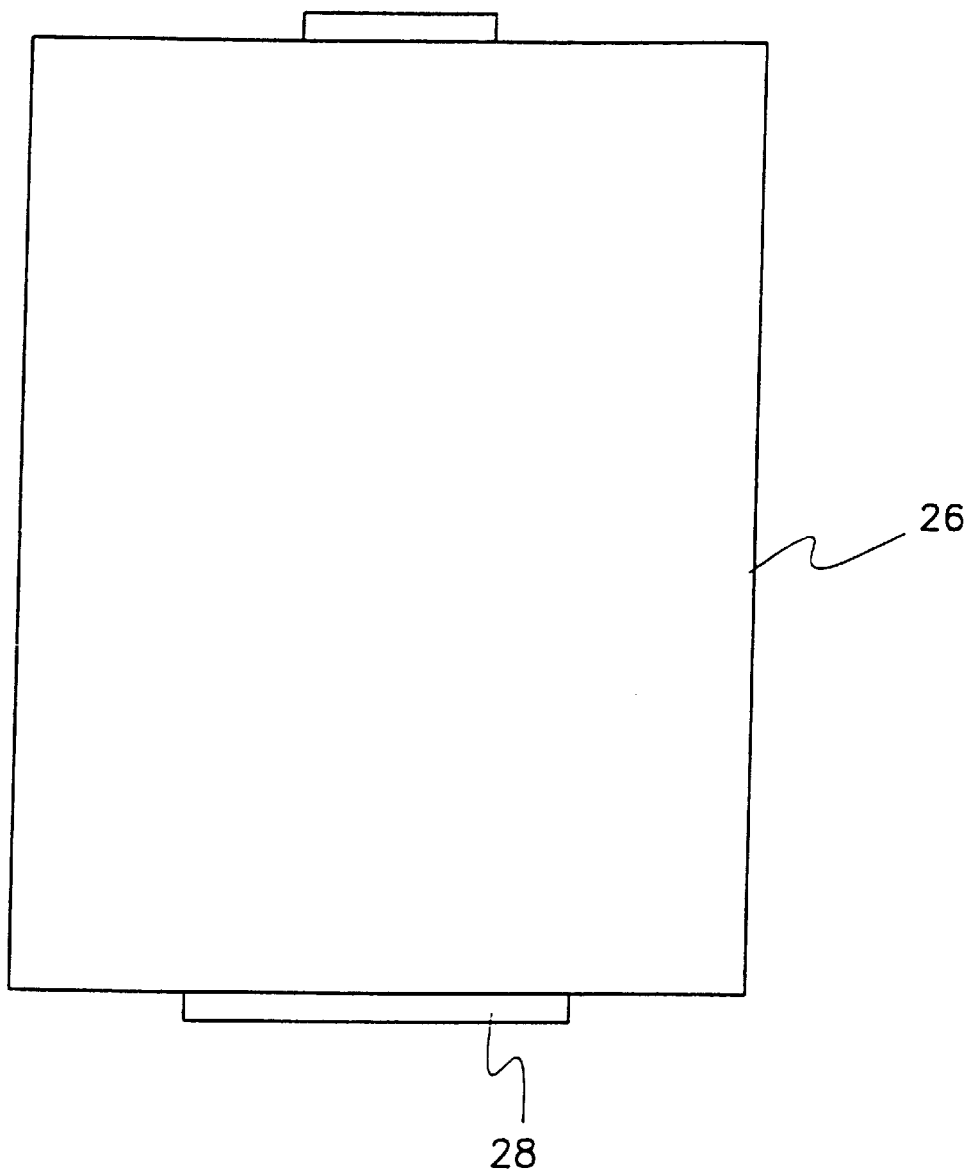
FIG. 4 is a front view of another conventional secondary battery.

FIG. 1 shows a prism-type secondary battery where a cap assembly according to a preferred embodiment of the present invention is employed, and FIG. 2 shows a cap assembly according to a preferred embodiment of the present invention.

As shown in the drawings, the inventive prism-type battery comprises a roll electrode assembly 2 consisting of a positive electrode, a negative electrode, and a separator disposed between the positive and negative electrodes; a can 4 into which the roll electrode assembly 2 is received, the can 4 contacting the negative electrode of the roll electrode assembly 2; and a cap assembly 60 close-tightly mounted on an upper end of the can 4. Internal insulating plates 8 are provided at upper and lower ends of the roll electrode assembly 2 to prevent the electrode assembly from contacting the cap assembly 60 and the can 4.

The cap assembly 60 comprises a negative plate 62 laser-welded on the upper end of the can 4 and a positive plate 66 disposed on a center portion of the cap assembly 60, an insulating plate 64 disposed between the negative and positive plates 62 and 66, and a rivet 68 penetrating through a center of the negative and positive plates 62 and 66.

As a feature of the present invention, a current control member 70 for preventing an overcurrent due to an outer short is mounted between the rivet 68 and the positive plate 66.

The current control member 70 is integrally assembled with the negative and positive plates 62 and 66 by the rivet 68.

An insulating gasket 72 is disposed between the rivet 68 and the current control member 70. The insulating gasket 72 also functions to insulate the rivet 68, which is connected to the positive electrode of the roll electrode assembly 2 by a tap 74, from the negative and positive plates 62 and 66.

Welded on an upper surface of the positive plate 66 is a positive terminal 76 spaced away and insulated from the current control member 70 but encapsulating the current control member 70 to isolate the same from the outside.

In addition, the negative plate 62 of the cap assembly 60 is welded on the upper end of the can 4, being electrically connected to the negative electrode of the roll electrode assembly 2 contacting the can 4. In addition, the positive plate 66 is connected to the positive electrode of the roll electrode assembly 2 via the rivet 68 connected to the positive electrode through the tap 74 and the current control member 70 connected to the rivet 68.

In the above connecting path, when an overcurrent flows by a short occuring outside of the battery, the current control member 70 reduces conductivity between the rivet 68 and the positive plate 66, thereby cutting off the flow of the current.

In addition, the negative plate 62 of the cap assembly 60 is indented inside the can 4 while being welded on the upper end of the can 4 so that the entire length of the battery is not increased due to the current control member 70. That is, the negative plate 62 is indented inside the can 4 as high as the thickness of the current control member 70. Generally, the thickness of the current control member 70 is about 0.8~1.0 mm.

As described above, since the current control member 70 is disposed in an unused space between the roll electrode assembly 2 and the cap assembly 60, the effective volume of the battery is not reduced, maintaining the capacity of the battery that does not have the current control member 70.

Other embodiments of the invention will be apparent to the skilled in the art from consideration of the specification and practice of the invention disclosed herein.

For example, if the negative plate 62 is not indented but flat, the height of the can 4 is reduced as high as the thickness of the current control member 70.

Therefore, it is intended that the specification and examples be considered as exemplary only, with the true scope and spirit of the invention being indicated by the following claims.

What is claimed is:

1. A cap assembly for a secondary battery having a can and a roll electrode assembly received in the can, the cap assembly comprising:

a negative plate for mounting on an upper end of the can;

a positive plate spaced-apart from the negative plate;

an insulating member positioned between the negative and positive plates;

a current control member disposed on the positive plate; and a rivet penetrating the negative and positive plates and the current control member, the rivet being insulated from the negative plate by a gasket and connected to the roll electrode assembly through a tab.

2. The cap assembly of claim 1 wherein the negative plate is indented toward an inside the can.

3. The cap assembly of claim 2 wherein the indented depth of the negative plate is the same as a thickness of the current control member.

4. The cap assembly of claim 3 wherein the thickness of the current control member is about 0.8~1.0 mm.

5. The cap assembly of claim 1 further comprising a positive terminal disposed on the positive plate.

6. The cap assembly of claim 5 wherein the positive terminal is spaced away from the current control member but encapsulates the current control member to isolate the same from the outside.

7. The cap assembly of claim 1 wherein the rivet is insulated from the positive plate by an insulating gasket.

8. A secondary battery comprising:

a can;

a roll electrode assembly received in the can, the roll electrode assembly comprising negative and positive electrodes and a separator disposed between the negative and positive electrodes; and a cap assembly comprising:

a negative plate welded on an upper end of the can, the negative plate being electrically coupled to the negative electrode contacting the can;

a positive plate insulated from the negative plate;

a current control member disposed on the positive plate; and a rivet penetrating central portions of the negative and positive plates and the current control member, the rivet being insulated from the negative plate by a gasket and connected to the roll electrode assembly through a tab.

9. The battery of claim 8 wherein the rivet is insulated from the positive plate.

10. The battery of claim 8 further comprising a positive terminal coupled to the positive plate.

11. The battery of claim 10 wherein the positive terminal is insulated from the current control member.

* * * * *